Figure 1:
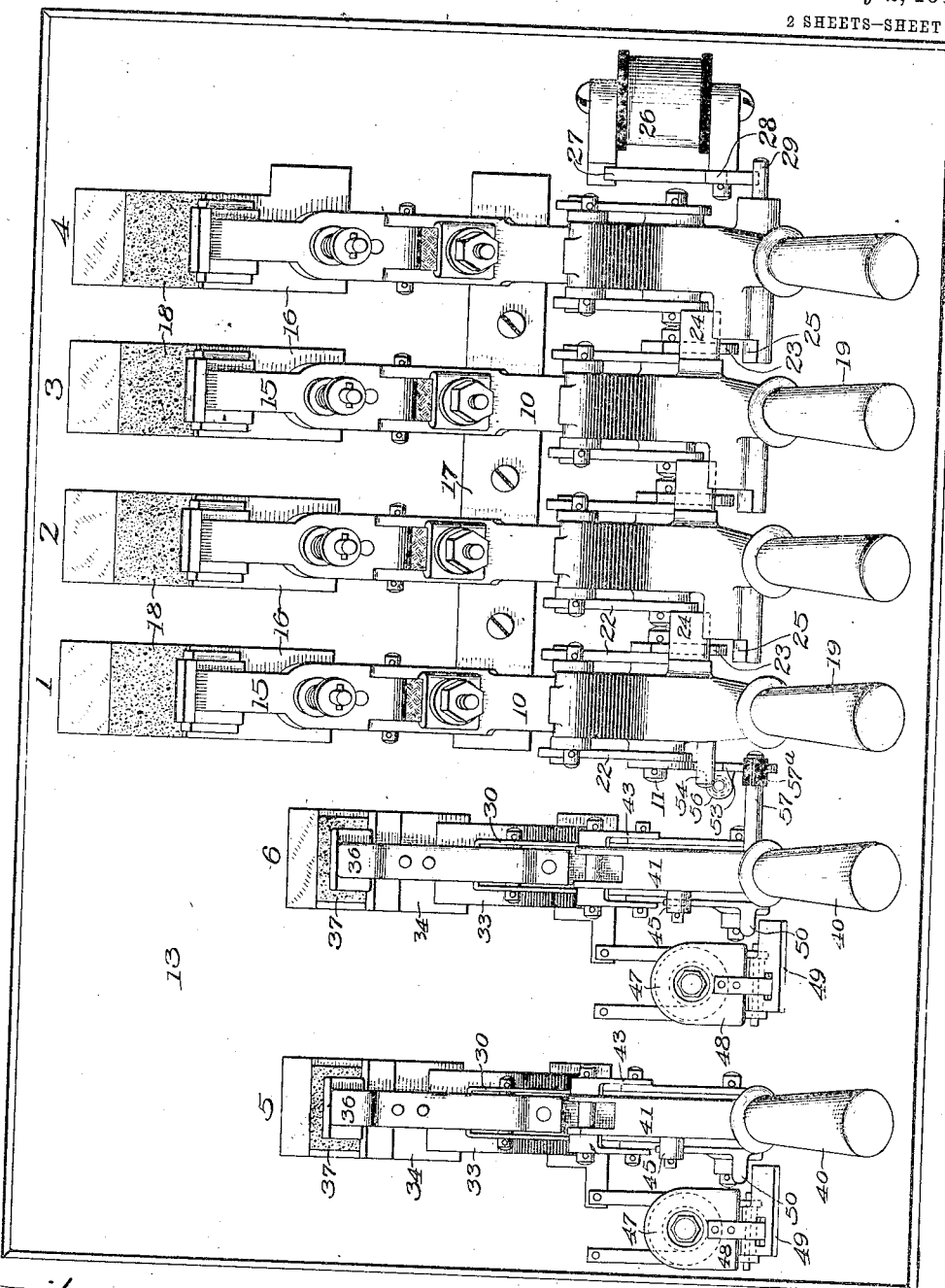

T. E. BARNUM.
MOTOR CONTROLLER.
APPLICATION FILED AUG. 26, 1909.

991,190.

Patented May 2, 1911.

2 SHEETS—SHEET 1.

Witnesses:
George Haynes
J W Fitzgerald

Inventor:
Thomas E. Barnum.
By Edwin B. H. Tower, Jr.
Atty.

T. E. BARNUM.
MOTOR CONTROLLER.
APPLICATION FILED AUG. 26, 1909.
991,190.
Patented May 2, 1911.
2 SHEETS—SHEET 2.
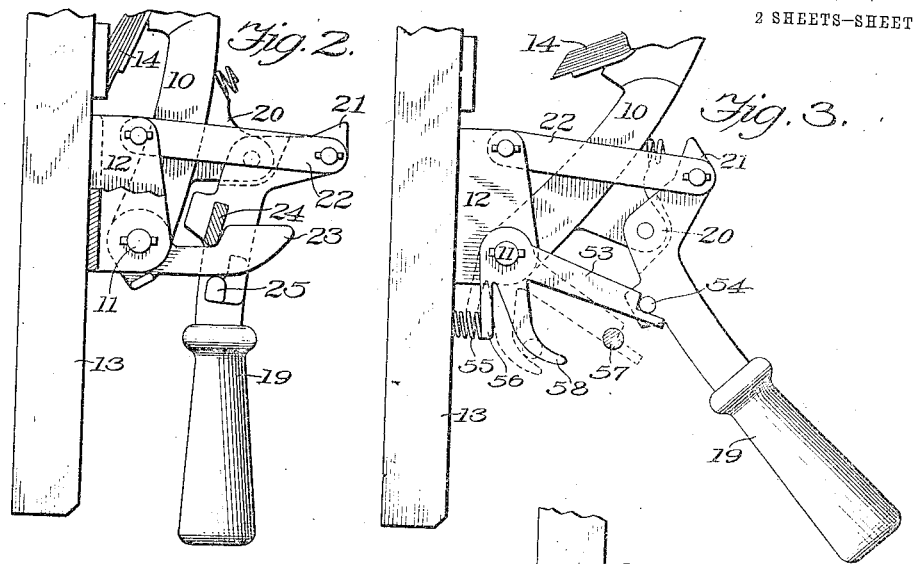
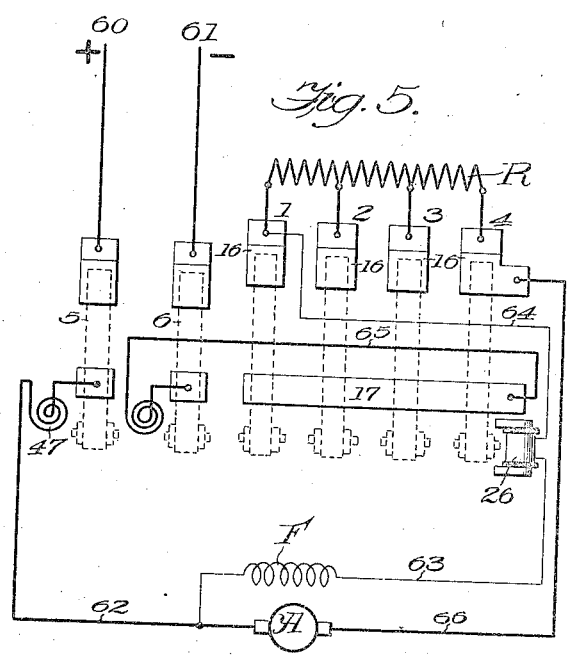
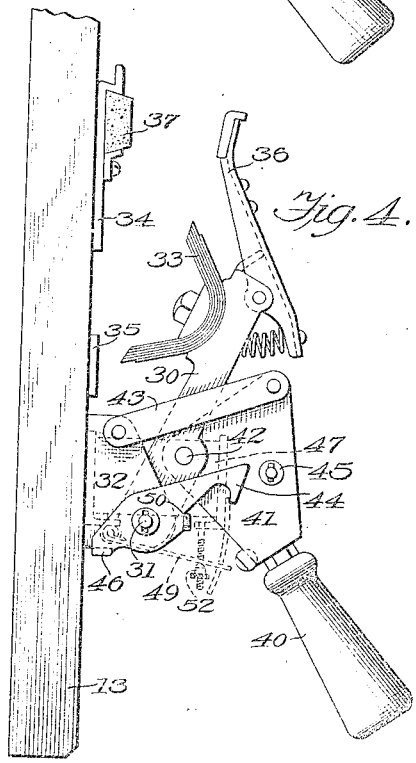
Witnesses:
George Haynes
SW Fitzgerald
Inventor:
Thomas E. Barnum.
By Edwin B. H. Tower, Jr.
Attorney.

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

991,190.

Specification of Letters Patent.

Patented May 2, 1911.

Application filed August 26, 1909. Serial No. 514,676.

*To all whom it may concern:*

Be it known that I, THOMAS E. BARNUM, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in controllers for electric motors.

My invention contemplates the use in conjunction with a suitable starting device for the motor of one or more circuit breakers for connecting the motor to the supply circuit in lieu of the usual main line switch. The use of circuit breakers for this purpose obviates the necessity of providing protecting fuses in the motor circuit. While fuses are capable of fully protecting the motor, yet the same are more or less troublesome and quite expensive to replace when burned out, and, therefore, the advantages derived from the use of circuit breakers is obvious inasmuch as when the same are tripped, they merely have to be reset.

In practice I prefer to employ a plurality of single pole circuit breakers, one connected to each of the supply lines. Furthermore, I preferably provide an interlock between the starting device and at least one of the circuit breakers to prevent operation of the starting device until such circuit breaker has been set. One of the main advantages of connecting a separate circuit breaker to each supply line is that it insures full protection of the motor regardless of whether the overload occurs upon both sides of the same or just on one side.

For the purpose of more clearly disclosing the characteristic features and advantages of my invention, I shall describe the device illustrated in the accompanying drawings, which embodies my invention in its preferred form. It should be understood, however, that my invention is not limited to the particular device shown, but is susceptible of various modifications.

In the accompanying drawings, Figure 1 is a front elevation of the device; Figs. 2 and 3 are detailed views of parts of the starting device; Fig. 4 is a side elevation of one of the circuit breakers, the tripping mechanism thereof being shown in dotted lines; and Fig. 5 illustrates diagrammatically one circuit arrangement for the device.

The device which I have shown for the purpose of illustration includes a plurality of starting switches 1, 2, 3 and 4, and circuit breakers 5 and 6. While the starting device illustrated is of the multiple switch type, it should be understood that my invention is not limited to any particular form of starting device. Furthermore, while I have shown two single pole circuit breakers, it should be understood that I might substitute a double pole circuit breaker in lieu thereof.

I shall first describe the multiple switch starting device illustrated. This device is of substantially the same construction as that disclosed in Patent No. 959,910, granted to me on May 31, 1910. The structure of this device is clearly disclosed in my copending application mentioned, and I shall, therefore, only briefly describe the same herein.

The several switches are of substantially the same construction. Each switch comprises a contact member 10, fulcrumed on a pin 11, carried by a supporting bracket 12. The brackets 12 may be secured in any suitable manner to a supporting panel 13. The contact member 10 carries a laminated main contact 14 and a pivoted arcing contact 15. The laminated contact is adapted to electrically connect a stationary contact 16 with a contact strip 17, while the arcing contact 15 is adapted to engage a stationary carbon contact 18. The contact member is adapted to be actuated by an operating lever 19 connected thereto in the following manner. The lever 19 is fulcrumed to a lug 20 on the contact member 10 and is provided with a projecting lug 21, to which a pair of links 22 are fulcrumed at one end. The opposite ends of the links 22 are fulcrumed to the supporting bracket 12. This arrangement provides a toggle connection between each contact member and its operating lever, whereby, when the lever is thrown inwardly, the contact member is thrown into engagement with its stationary contacts. With the arrangement illustrated, each of the switches has a tendency to move into open position, and I have, therefore, provided latches 23, best illustrated in Fig. 2, for holding the several switches in closed position. Each latch is fulcrumed on the supporting pin 11 of its corresponding switch and is adapted to engage a lug 24 projecting from the operating lever of its corresponding switch to hold the same in closed position. Fig. 2 illustrates the manner in which the latches lock the switches in closed position. The latch 23 and lug 24, illustrated in this figure, belong to switch 1, which has been omitted to better illustrate the manner in which the latches and lugs function. The latches 23 normally tend to disengage the lugs 24, and I have, therefore, provided on each of the operating levers a lug 25 adapted to engage the latch of the next preceding switch to move and retain the same in holding position. With this arrangement, each switch, when closed, holds a preceding switch closed, thereby enabling the several switches to be closed by a hand-over-hand movement. Furthermore, the latches and lugs before mentioned coöperate to insure closure of the several switches in a definite sequence as is clearly set forth in my copending application above mentioned. For holding the last switch of the sequence closed, I provide a retaining magnet 26 having a pivoted armature 27, provided with a hook portion 28 arranged to engage a pin 29 provided on the last switch of the sequence.

I shall now briefly describe the structure of one of the circuit breakers, both of which are of the same construction. It should be understood, however, that my invention is not limited to any particular form of circuit breaker. The form of circuit breaker illustrated comprises a contact member 30, fulcrumed on a pin 31, carried by a supporting bracket 32. The supporting bracket 32 may be secured in any suitable manner to the insulating base 13. The contact member 30 carries a laminated main contact 33 adapted to bridge a pair of stationary contacts 34 and 35. In addition to the main contact 33, the contact member carries a pivoted arcing contact 36, arranged to engage a carbon contact 37. The contact member 30 is adapted to be actuated by an operating lever 40. The lever 40 is provided with an enlarged portion 41, fulcrumed to the contact member at 42. Pivotally connected to the portion 41 of the operating lever, at its upper and outer extremity, are a pair of links 43. The links 43 are also pivotally connected to the supporting bracket 32. This arrangement is substantially the same as that of the starting switches, and provide a toggle connection between the contact member 30 and its operating lever. As constructed, the circuit breaker tends to move into open position. This tendency may be increased by providing a suitable spring for this purpose. The circuit breaker is adapted to be maintained in closed position by means of a latch 44, fulcrumed on the pin 31. The latch 44 has a hook portion adapted to engage a roller 45, projecting laterally from the portion 41 of the operating lever 40. The hook portion of the latch 44 is so constructed that when the operating lever is thrown inwardly to set the circuit breaker, the roller 45 will raise the latch until the circuit breaker is closed, whereupon the latch will fall by gravity into holding position. Downward movement of the latch is limited by means of a lug 46 provided thereon to engage the underside of the supporting bracket 32. For tripping the circuit breaker upon the occurrence of abnormal conditions, I provide an electromagnet 47, having suitable pole pieces 48. Pivotally connected to one of the pole pieces 48 is an armature 49 for the electromagnet, which is adapted to be drawn upwardly by said magnet when the same responds to abnormal conditions. The pivoted armature 49 is adapted, when raised, to engage a laterally extending projection 50 on the latch 44 of the circuit breaker to raise the same out of engagement with the roller 45 on the operating lever. This releases the circuit breaker, whereupon the same automatically moves to open position.

As shown in dotted lines in Fig. 4, an adjusting device 52 may be provided to vary the distance between the armature 49 of the magnet and its forward pole piece to vary the calibration of the circuit breaker.

I shall now describe the interlock between the circuit breaker 6 and switch 1 of the starting device, it being understood that various other arrangements may be provided for accomplishing the same result. Fulcrumed on the supporting pin 11 of switch 1 is a dog 53, having a notched portion at the outer end thereof for engaging a pin 54, projecting laterally from the operating lever of switch 1. This arrangement is best illustrated in Fig. 3. The dog 53 is adapted to engage the pin 54 only when the switch 1 is in open position; but, when in engagement with said pin, effectually prevents closure of said switch. The dog 53 is yieldingly held in a position to engage the pin on the operating lever of switch 1 by means of a spring 55 interposed between the supporting panel 13 and an extension 56 provided on said dog 53. For withdrawing the dog 53 out of engagement with the pin 54, I provide a laterally extending pin 57 on the operating lever of circuit breaker 6, which, when said operating lever is thrown inwardly, is adapted to engage a curved extension 58 on the dog 53 to move the same downwardly. The portion of the pin 57 which contacts with the dog 53 is preferably provided with an insulating covering 57ª. When the circuit breaker 6 is in open position, the pin 57, carried thereon, assumes the position illustrated in full lines in Fig. 3, in which position it is in the path of the extension 58 of the dog 53. Consequently, when the operating lever of the circuit breaker is thrown inwardly, the pin 57 will engage the extension 58 of the dog 53, thereby forcing the same downwardly into the position illustrated in dotted lines. The dog 53 is thus moved out of the path of the pin 54 on the operating lever of switch 1, thereby rendering said switch free to be closed.

It has already been seen that the starting switches can only be closed in a definite sequence, and, consequently, as long as the circuit breaker 6 remains open, none of the starting switches can be closed.

I shall now describe the circuit arrangement for the device illustrated in Fig. 5. In this figure, the device above described is arranged to control an electric motor provided with an armature A and a shunt field winding F. The starting device is arranged to control a variable resistance R connected in series with the motor armature. Assuming that current is supplied from main lines 60 and 61, when it is desired to start the motor, the circuit breakers 5 and 6 should first be closed. This, however, does not close the motor circuit, which is not closed until switch 1 of the starting device is operated. Of course, as soon as the circuit breaker 6 is set, the several switches of the starting device may be operated. Upon closure of switch 1, circuit is closed from main line 60 through the circuit breaker 5 and its tripping coil 47, by conductor 62, through the shunt field winding F of the motor, by conductor 63, through the retaining magnet 26 of the starting device, by conductor 64 to contact 16 of switch 1, thence through the said switch to contact strip 17, and by conductor 65 through the tripping coil of the circuit breaker 6, and through said circuit breaker to main line 61. This completes the field circuit of the motor. Also upon closure of switch 1, circuit is closed from conductor 62 through the motor armature, by conductor 66 to the contact 16 of switch 4, and through all of the resistance R to switch 1, and thence to main line 61 as already traced. The motor is thus started with all of the starting resistance in circuit. Successive operation of the starting switches gradually removes the resistance R from the motor circuit, thereby bringing the motor up to speed. When the last switch 4 has been closed, the retaining magnet 26, which, in the present instance, is connected in the field circuit of the motor, maintains said switch in closed position.

As has already been set forth, it is impossible to operate the multiple switch device until the circuit breaker 6 has been set. Consequently, if an attempt be made to start the motor without first closing the circuit breakers, the operator would immediately be made aware of the fact that the circuit breakers were open. On the other hand, without the interlock, the operator might close all of the starting switches before discovering that the circuit breakers were open, and thus have to repeat the whole starting operation. Of course, if desired, a similar interlock to that above described might be interposed between the two circuit breakers, but, in practice, such additional interlock would rarely be required.

Having thus described my invention, what I desire to secure by Letters Patent, is:—

1. In a controller for electric motors, in combination, a plurality of switches adapted to be operated to start the motor, a circuit breaker connected in the motor circuit, and means necessitating the closure of said circuit breaker prior to the operation of said switches.

2. In a controller for electric motors, in combination, a plurality of switches for starting the motor, said switches being interlocked to close in a definite sequence, a circuit breaker connected in the motor circuit, and an interlock between said circuit breaker and the first switch of the sequence to necessitate closure of the former prior to the operation of the latter.

3. In a controller for electric motors, in combination, a starting device for the motor comprising a plurality of manually operated switches interlocked to close in a definite sequence, a circuit breaker connected in the motor circuit, and means necessitating closure of the circuit breaker prior to the operation of the first switch of said device.

4. In a controller for electric motors, in combination, a plurality of manually operated switches for starting the motor, said switches being interlocked to close in a definite sequence, a circuit breaker connected in the motor circuit, and a mechanical interlock between said circuit breaker and the first switch of the sequence to necessitate closure of the former prior to the operation of the latter.

5. In a controller for electric motors, in combination, a supply circuit for the motor, a circuit breaker connected to each supply line, a starting device for the motor biased to off position, a retaining magnet for maintaining said device in running position, said magnet being adapted to be deënergized upon the opening of either of said circuit breakers, and an interlock between said device and one of said circuit breakers necessitating closure of the latter prior to the operation of the former.

6. In a controller for electric motors, in combination, a supply circuit for the motor, a circuit breaker connected to each supply line, a plurality of switches for starting the motor, a retaining magnet for holding said switches in closed position, said magnet being adapted to be deënergized upon the tripping of either of said circuit breakers, and means necessitating closure of one of said circuit breakers prior to the operation of said switches.

7. In a controller for electric motors, in combination, a supply circuit for the motor, a circuit breaker connected to each line of the supply circuit, a plurality of manually operated switches for starting the motor, said switches being interlocked to close in a definite sequence, a retaining magnet for said switches, said magnet being arranged to be deënergized upon the tripping of either of said circuit breakers, and an interlock between one of said circuit breakers and the first switch of the sequence necessitating closure of the former prior to the operation of the latter.

8. In a controller for electric motors, in combination, a starting device, a circuit breaker and means necessitating closure of said circuit breaker prior to operation of said starting device.

9. In a controller for electric motors, in combination, a motor controlling switch, means tending to lock said switch against operation when the same is returned to initial position, and a circuit breaker included in the motor circuit and adapted when set to cause said means to release said switch.

10. In a controller for electric motors, in combination, a multiple switch device, a circuit breaker and an element biased to move into the path of the first switch of said device when the same is opened to prevent closure thereof, said circuit breaker when closed being adapted to move said element out of the path of said switch to permit closure thereof.

In witness whereof, I have hereunto subscribed my name in the presence of two witnesses.

THOMAS E. BARNUM.

Witnesses:
FRANK H. HUBBARD,
S. W. FITZGERALD.